UNITED STATES PATENT OFFICE.

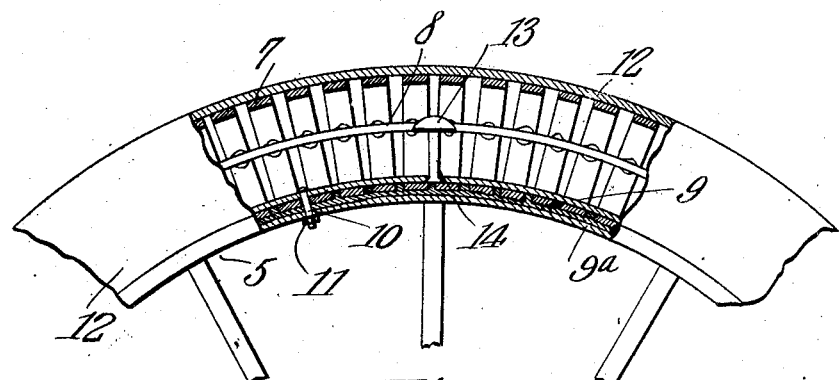
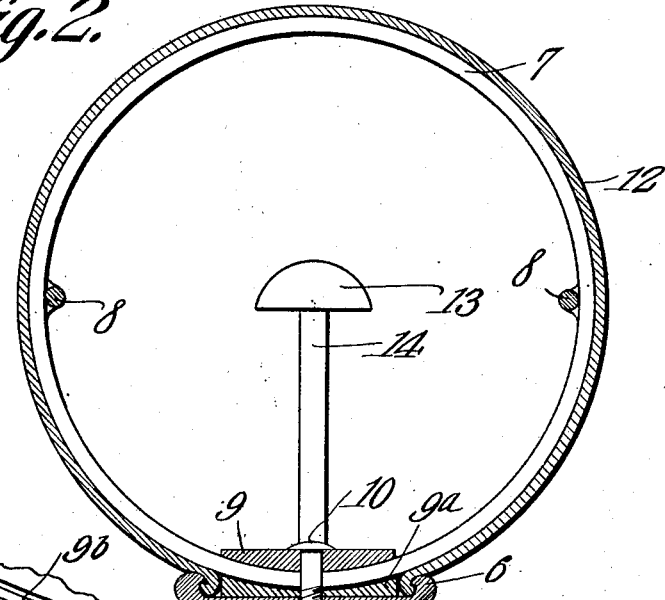
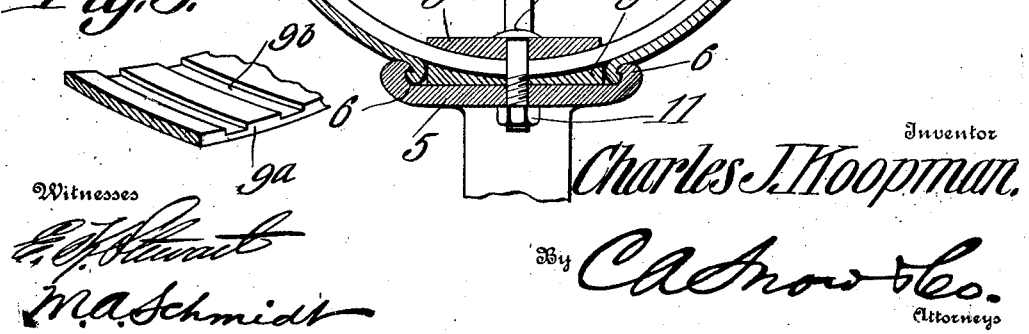

CHARLES JOHN KOOPMAN, OF MIDDLETOWN, CALIFORNIA.

RESILIENT TIRE.

1,037,642.  Specification of Letters Patent.  Patented Sept. 3, 1912.

Application filed March 9, 1909. Serial No. 482,294.

*To all whom it may concern:*

Be it known that I, CHARLES JOHN KOOPMAN, a citizen of the United States, residing at Middletown, in the county of Lake and State of California, have invented a new and useful Resilient Tire, of which the following is a specification.

This invention relates to that class of tires in which resiliency and elasticity are obtained by means of springs, and the object of the invention is to provide improved means for mounting and supporting the springs, and also to so construct the tire that it may be applied to the rim of any ordinary motor vehicle wheel without altering or modifying the same.

With the foregoing objects in view, the invention consists in a novel construction and arrangement of parts to be hereinafter described and claimed, reference being had to the drawing hereto annexed in which—

Figure 1 is an elevation of a fragment of the tire, partly in longitudinal section. Fig. 2 is an enlarged transverse sectional view. Fig. 3 is a perspective view of a fragment of one of the bands whereby the tire is secured to the wheel rim.

Referring more particularly to the drawings, 5 denotes the rim of an ordinary motor vehicle wheel, said rim being provided with the usual channel 6 in which the tire seats.

The tire which is the subject of the present invention comprises a series of resilient rings 7 which are secured in spaced relation on the rim 5. The rings may be of any shape in cross section, and they are of a suitable size and strength to stand the strain they are subjected to. The rings extend transversely and radially with respect to the rim, and as many per running foot are employed as are necessary to sustain the weight of the vehicle. The rings are connected in spaced relation by means of annular flexible strips 8 which are secured in any suitable manner as by brazing, soldering, or otherwise to the inside thereof. Two of these spacing and connecting strips are provided, they being preferably located at the sides of the tire.

The rings are fastened to the rim 5 by means of annular bands 9 and 9ª. The band 9 passes through the rings, extends concentric with the wheel rim, and coincides with the channel thereof, it being fastened to the rim by bolts 10 or other suitable means. This band is inside the rings, and that side of the band which engages the rings is made convex as shown in Fig. 2 to conform to the outline thereof. The band 9ª fits in the channel of the rim, and is fastened therein by the bolts 10. The rings are held between the bands 9 and 9ª, and that side of the band 9ª which is in contact with the rim is flat to fit snugly thereon, and the opposite side is provided with transversely extending grooves 9ᵇ which are spaced apart and receive the rings, there being a groove for each ring. The bottoms of the grooves 9ᵇ are curved to fit the rings. Upon tightening up the bolts 10 by means of their nuts 11, the rings will be securely clamped between the bands, and the latter are rigidly fastened to the rim of the wheel.

The tire is also provided with a cover 12 which may be of rubber, canvas, leather, or other flexible material. This cover may be secured to the wheel rim in the same manner as an ordinary clencher tire, it being held in the channel of the tire by the rings. The cover prevents water, rocks or any other foreign matter from reaching the springs, and effectually protects the same. The cover is also desirable for the sake of appearance. The appearance of the tire does not differ from that of the ordinary pneumatic tire now in use.

It will be understood, of course, that there will be a break in the strips 8 and the bands 9 and 9ª in order that the tire may be placed on the rim, and the ends of said parts may be connected in any suitable manner.

At suitable intervals, the tire is provided with bumpers 13 carried by posts 14 rising from the plate 9 and secured thereto in any suitable manner. The parts 13 may be of rubber or other suitable cushioning material and their purpose is to prevent the rings from being forced too far in the direction of the rim, and to prevent possible breakage by too severe contact with solid obstacles, ruts, etc. The bumpers also assist to prevent the tire from entirely collapsing in case of breakage of some of the rings, as many of such bumpers being provided as will best serve this purpose.

A tire constructed as herein described, has sufficient resiliency to be successfully substituted for a pneumatic tire, it is strong and durable and can be made to fit different sized wheels, and rims, and in different strengths according to the class of vehicles to which it is to be applied.

As many of the strips 8 may be employed as will be found necessary to properly hold the rings in spaced relation, and if desired, the cover 12 may be cemented or otherwise mounted on the rings.

What is claimed is:

A device of the class described comprising a channeled rim; a cover having its edges engaged with the rim; an annular band seated in the channel of the rim and having its outer face concaved upon the same radius as the inner face of the cover, the lateral edges of the concaved face being in close and intimate contact with the cover, whereby the cover and the band will define a continuous surface, the outer surface of the band being provided with transverse grooves extended unbroken across the median plane of the wheel; rings disposed radially about the rim and seated in the grooves, the peripheries of the rings being continuously engaged throughout their entire extent by the inner surface of the cover and by the concaved face of said annular band; a second annular band located within the rings, and bearing against those portions of the rings which are engaged in the grooves, the outer face of the last mentioned band being parallel with the outer face of the rim; and securing elements extended through both bands and through the rim, the securing elements having parallel terminal elements engaging the outer face of the last specified band, and the under face of the rim.

In testimony that I claim the foregoing as my own, I have hereto affixed my signature in the presence of two witnesses.

CHARLES JOHN KOOPMAN.

Witnesses:
H. C. Betts,
H. J. Quigler.